United States Patent [19]

Guerrieri

[11] 4,104,338
[45] Aug. 1, 1978

[54] BUBBLE CAP TRAY

[76] Inventor: Salvatore A. Guerrieri, 503 Beverly Rd., Newark, Del. 19711

[21] Appl. No.: 682,088

[22] Filed: Apr. 30, 1976

[51] Int. Cl.$^2$ .............................................. B01D 3/20
[52] U.S. Cl. .............................................. 261/114 TC
[58] Field of Search ........ 261/114 R, 114 TC, 114 A; 52/246; 138/89, 91, 96 R, 114

[56] References Cited

U.S. PATENT DOCUMENTS

| | | | |
|---|---|---|---|
| 2,917,293 | 12/1959 | Mendelsohn et al. | 261/114 R |
| 3,601,320 | 8/1971 | Du Plessis | 138/114 |
| 3,914,352 | 10/1975 | Guerrieri | 261/114 TC |

Primary Examiner—Tim R. Miles
Assistant Examiner—Gregory N. Clements

[57] ABSTRACT

This invention relates to an improved bubble cap tray for use in towers employed in liquid-vapor contacting service such as distillation, absorption, and similar operations. The tray is an assembly of channels (or troughs) of two different widths, each channel having a cross section shaped approximately like a block U. The wide ones form the tray floor and chimneys. They are spaced from each other with the sides of the channels pointing upward having the space between two adjacent channels closed at each end by an end closure whereby the combination of the sides of two adjacent channels and the two end closures form a long, low, narrow chimney. The narrow channels, the ends of which are closed by extensions of the same end closures, are the caps which are placed over the chimneys, with the sides of the channels pointing down, the resulting assembly thus providing a continuous vapor passage connecting the space below said assembly with the space above it.

4 Claims, 4 Drawing Figures

VIEW A-A

SECTION B-B

MODULE

PLAN VIEW

BUBBLE CAP TRAY

1. Field of the Invention

The present invention is directed to an improvement in the construction of bubble cap trays used in towers in distillation service or in other applications which require intimate vapor-liquid contact.

This invention application provides an improvement over the invention of my U.S. Pat. No. 3,914,352 which disclosed improvements over prior art in bubble cap tray constructions leading to better performance and lower cost.

2. Description of the Prior Art

A vapor-liquid contactor, such as a distillation tower, has a plurality of trays spaced one above the other within an enclosure formed by the wall of a vertical shell, closed at top and bottom, having inlet and outlet connections, etc., attached at locations according to the needs of the process conducted therein as is well known by those who are familiar with the art. Gases and vapors flow upward through a tray while a liquid flows across the tray from the outlet of the downcomer from the tray above to the inlet of the downcomer leading to the tray below. The gas or vapor entering a tray, rises through the liquid passing over the tray and generates a turbulent vapor-liquid interface across which mass and heat transfer can take place.

The most widely used vapor-liquid contacting device has been the bubble cap tray. Such trays are usually constructed of metal plates which are fastened to suitable vertically spaced supports firmly attached to the tower. The plates are pierced with holes, and short tubes are fitted into these holes to serve as chimneys for conveying the gases and vapors through the trays. Caps, which are provided with slots uniformly spaced along the periphery, are placed over the chimneys to divert the vapor stream downward and into the liquid flowing across the trays. Thus vapor from a tray passes upwardly through the chimneys of the tray above it, then reverses its direction and flows down through the annular space between the cap and chimney, then through the slots along the cap's periphery into the liquid. As just described both the chimneys and caps are round, but to improve performance, almost every other conceivable cap shape has been advocated or tried. These shapes include hexagonal caps and relatively long narrow caps, generally rectangular in shape. It is general practice to provide slots as described above for all caps whatever their shape. The most popular round caps range between four and eight inches in diameter although both larger and smaller caps have been used. These are usually, but not always, arranged on the trays in an equilateral triangular pattern and the clearance between caps is usually, but not always, about one quarter of the cap diameter. Caps are usually installed with the bottom edge between ½ and 2 inches above the tray floor.

Although the long rectangular caps did not gain the popularity of the round caps, they performed better. The improvement was due to the more uniform distribution of vapor over the whole tray because the liquid gradient across the tray with these caps was lower than with round caps. The improed vapor-liquid contact thus obtained resulted in higher tray efficiencies.

Following World War II, the principal development effort has been on the sieve tray and its variations. Sieve trays are handicapped because of poor performance at operating rates moderately lower than design. Valve trays overcome this difficulty to some extent but are more complicated and more costly than sieve trays. The customary round bubble cap tray, unlike sieve trays, can retain good performance at lower than design rates, but cannot compete with sieve trays because of higher cost and poorer performance at design rates. The bubble cap tray of my cited invention is a significant improvement over former bubble cap trays.

OBJECTIVE OF THIS INVENTION

An objective of this invention is to improve further the construction of bubble cap trays, thus to realize a further reduction in the cost of construction without sacrificing performance.

These objectives and others will become apparent from the following disclosure with reference to the accompanying drawing.

SUMMARY OF THE INVENTION

The complete tray according to this invention includes an assembly of U-shaped flat bottomed channels of two different widths thicknesses. In the construction of this invention, the wider channels, which are used to form the tray floors and chimneys, are the thinner ones, whereas the narrower channels, which are used to form the caps, are the thicker ones.

The wide channels are spaced parallel to each other a small distance apart with the sides of the channel pointing upward and with the ends of the spaces between the channels closed by end closures attached to the sides of the channel, whereby the combination of two adjacent sides and related end closures form a long, low, narrow chimney. The top of these end closures project above the top of the sides of the channel whereas the bottoms of said end closures are in the plane of the bottom faces of the channels. The distance between adjacent channels, depending upon the design operating conditions within the tower, ranges between a fourth of an inch and 1½ inches. The widths of the channels may vary proportionately between 2 and 6 inches, and the height of the sides of the channels likewise may vary between three-fourths of an inch and 2 inches.

The narrow channels, from which the caps are formed are placed over the chimneys with the sides of the channels pointing down and with their ends closed and supported by said chimney end closures. The end closures have a modified U-shaped cross section with the outer extensions of the sides of the U at a greater distance from each other than the inner extensions. The sides of the U are formed by turning said inner extensions, first outwardly 90° and extending the sides outwardly for a distance, and then turning said outward extensions back 90° to form sides extending in the same directions as the inner extensions but spaced at a greater distance from each other. The distance between the outside faces of the wider portion of said end closure is equal to the inside width of the cap channel. The height of said end closure is equal to the distance between the bottom face of the tray channel and the inside face of the cap channel. A brace is included, which extends between the outer extensions of said end closure. The ends of the tray and cap channels, the end closure, and the brace are firmly attached to each other. The bottom edge of the cap is located only high enough above the floor of the tray to make a long, narrow opening or slot between the tray floor and the edge of the cap. The height of the slot, and hence the area of the opening is determined for each case by the vapor and liquid flow rates and other process conditions. In all cases, however, the bottom edge of the cap is lower than the top edge of the chimney in order to provide a liquid seal which prevents the passage of liquid through said tray to the tray below.

DESCRIPTION OF THE DRAWING

Reference is made to the drawing wherein the elements of the invention are presented in four figures and like reference numerals denote like parts.

PREFERRED EMBODIMENT

Figure 2:
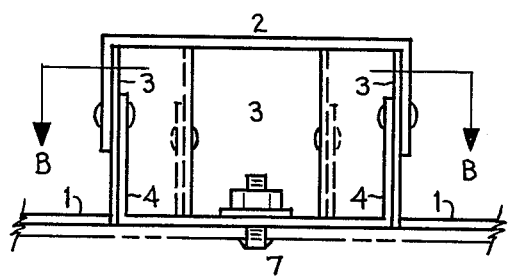
FIG. 2 is an elevational view taken along line AA of FIG. 3. It shows end closure 3 which supports cap channel 2, spaces tray channels 1, and closes the ends of the channels. The end view of brace 4 is also seen.
Figure 1:
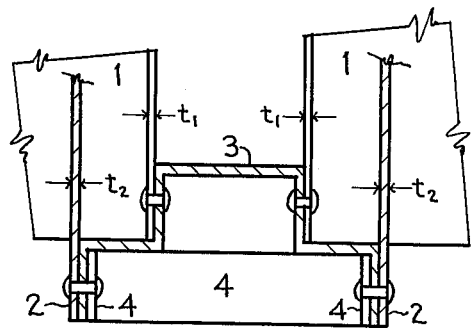
FIG. 1 is a sectional plan view of one end of a single bubble cap assembly showing end portions of two tray channels 1, and of cap channel 2, end closure 3, and brace 4, all parts being firmly attached to each other. The thickness of the tray channel is shown as $t_1$, the thickness of the cap channel is shown as $t_2$, wherein $t_2$ is greater than $t_1$. Brace 4 adds strength to the end assembly. The other end of the bubble cap assembly is similarly constructed. A plurality of these assemblies is combined to form a module which is installed in the tower. Each module comprises $n$ cap channels and $n+1$ tray channels wherein $n$ is a whole number greater than 1. The completed tray comprises a plurality of such modules fastened to each other and to the tray support. A cross section of a typical module is shown in FIG. 4, which is seen to comprise four cap channels and five tray channels wherein the two outside tray channels are inverted cap channels 21.
Figure 4:
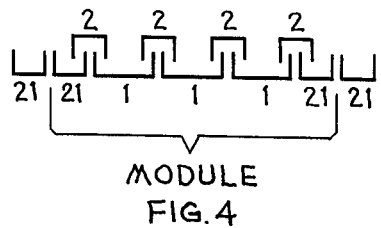
Figure 3:
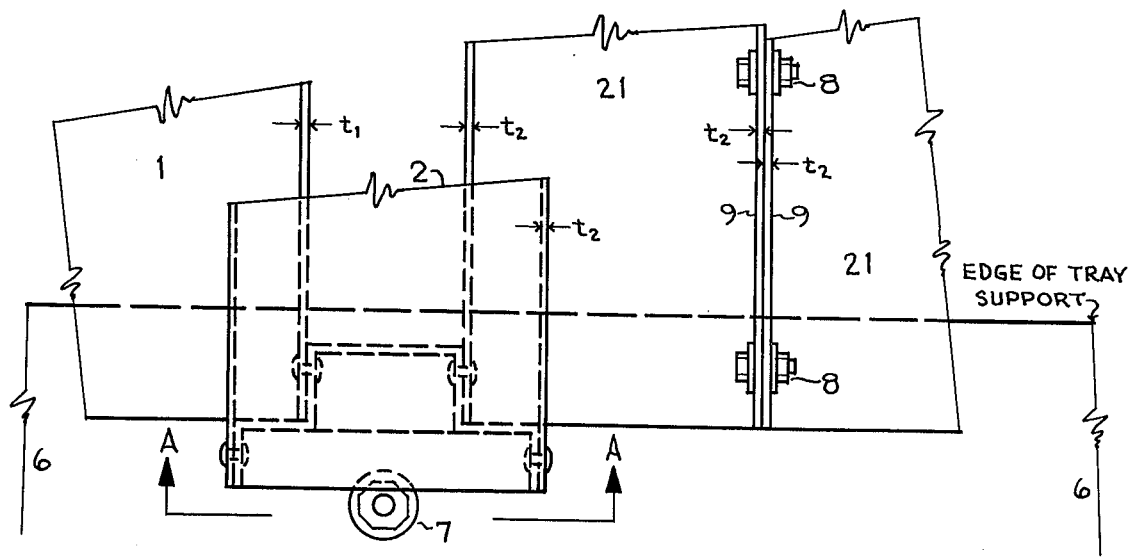
FIG. 3 is a plan view of one corner of a module including one free side 9 of the module and the free side 9 of an adjacent module. In addition to the parts already described, this figure shows a section of tray support 6, fastening means 7 for fastening the bubble cap to tray support 6 and fastening means 8 for fastening the free sides 9 of two adjacent modules.

The tray assembly requires no unusual or novel means of support or attachment to the tower shell. Standard practice, only modified to satisfy the needs of this invention, is followed, and therefore these parts need not be elaborated here.

The channels comprising the tray floor and caps and the end closures can be formed by mechanical operations making low cost simple mass production methods possible. The metal thickness of the parts may vary with each application because this dimension depends upon a number of factors which are sure to vary with each application. Such dimensions make allowance for corrosion, unsupported length of channels, permissible deflection under load, and the like. I have found that when proper allowance is made for expected loads, the metal thickness of the tray channels can be less than the thickness of the cap channels resulting in a lower cost of construction. This is completely opposite to former methods of construction where the trays had to be made strong enough to support all expected loads, including caps. For mechanical as well as for economical reasons the width of the chimneys should preferably be not less than $\frac{1}{4}$ inch, and for performance reasons, usually not more than $1\frac{1}{2}$ inches. The latter limit is related to the distance between the faces of adjacent caps and the effect this distance has upon vapor-liquid contact efficiency.

A critical and important dimension is the distance between the top edge of the chimney and the bottom edge of the cap. This is the seal provided to prevent loss of tray liquid by leakage through the vapor passages between the caps and chimneys unto the tray below. Normally, a $\frac{1}{4}$ inch seal is adequate for a tray constructed in accordance with the criteria of this invention but it may be varied to fit the needs of the process.

EXAMPLE

As already stated, this invention provides considerable latitude in the dimensions of the parts for a specific tray design. Vapor and liquid traffic in this example is such that a ratio of chimney area to active area of 0.15 is required. The liquid seal (distance between top edge of chimney and bottom edge of cap) is to be 0.5 inch. To keep the example simple assume that the tray is large and therefore that dimensions computed for one bubble cap will be satisfactory for the whole tray.

Use a trial chimney width of one inch, and a slot width of one-half inch. Assume tray and cap channels are 20 gauge (0.0375 inch) and 16 gauge (0.0625 inch), respectively. The other dimensions become:

|  | inches |  |
| --- | --- | --- |
| top of chimney to underside of cap | 0.50 | minimum |
| between tray and cap sides | 0.525 |  |
| between bottom of cap sides and tray floor | 0.50 |  |
| inside width of cap and tray sides | 0.75 |  |
| outside width of cap channels | 2.25 |  |
| center-to-center cap spacing | 4.0 |  |
| outside width of tray channels | 3.0 |  |
| distance between faces of adjacent caps | 1.75 |  |
| distance between tray supports | 60.0 |  |
| length of caps | 64.0 |  |

These dimensions appear to be satisfactory but must be confirmed by other criteria, known in the art, such as allowable pressure drop, tray stability, permissible entrainment, and the like, to assure good performance. Furthermore, the dimensions should be checked mechanically for such factors as allowable deflection under load for the effect of cap width and cap length upon cost. The results of such computations may require some modification in the dimensions tabulated above.

A preferred embodiment of this invention has been described, but the invention should not be considered limited in scope to the specific details of construction illustrated and described. It is understood that details are subject to variation without departing from basic features within the scope of the claims.

I claim:

1. An improved liquid-vapor contacting bubble cap tray constructed of channels of two different widths and thicknesses, each channel having a cross section shaped approximately like a block U, the wider channels forming the tray floor and chimneys, being spaced from each other with the sides of channels pointing upward and the space between two adjacent troughs being closed at each end by an end closure whereby the combination of the sides of two adjacent channels and the two end closures form a long, low, narrow chimney; the narrower channels, with sides pointing downward, and with each end closed by said end closures, to form caps which are positioned over the chimneys, thereby providing a continuous vapor passage connecting the space below said channels with the space above them, said vapor passages being uniformly spaced across the diameter of the tower with their long axes parallel to each other, the improvement wherein said tray channels are thinner than said cap channels and said end closures have a modified U-shaped cross section, the outer extension of the sides of said U being at a greater distance from each other than inner extensions, said sides being formed by turning said inner extension first outwardly 90° and extending said sides outwardly for a distance and then turning said outward extension back 90° to form sides extending in the same direction as the inner extension of said sides but spaced at a greater distance from each other, the distance between the outside faces of the narrower portion of said closure being equal to the distance between adjacent tray channels, the distance between the outside faces of the wider portion of said closure being equal to the inside width of the cap channel, the height of said closure being equal to the distance between the bottom face of said tray channels and the inside top face of the cap channel, the ends of the tray channels, the cap channel and said closures being firmly attached to each other.

2. The bubble cap tray of claim 1 wherein said end closure includes a brace firmly attached to said end closure and to said cap channel.

3. The bubble cap tray of claim 1 wherein a plurality of said cap and tray channels is combined to form a module, the two outside tray channels of said modules being inverted cap channels.

4. The bubble cap tray of claim 3 wherein a plurality of said modules is combined to form a bubble cap tray said modules being firmly fastened to tray supports and to each other.

* * * * *